United States Patent
Yang

(10) Patent No.: US 9,986,141 B2
(45) Date of Patent: May 29, 2018

(54) EXTENSION PHOTOFLASH LIGHT AND CAMERA SYSTEM USING THE SAME

(71) Applicant: Steve Wiyi Yang, Taipei (TW)

(72) Inventor: Steve Wiyi Yang, Taipei (TW)

( * ) Notice: Subject to any disclaimer, the term of this patent is extended or adjusted under 35 U.S.C. 154(b) by 0 days. days.

(21) Appl. No.: 15/476,152

(22) Filed: Mar. 31, 2017

(65) Prior Publication Data
US 2017/0289418 A1    Oct. 5, 2017

Related U.S. Application Data

(60) Provisional application No. 62/317,062, filed on Apr. 1, 2016.

(51) Int. Cl.
| | |
|---|---|
| *H04N 5/222* | (2006.01) |
| *G03B 15/03* | (2006.01) |
| *G03B 7/099* | (2014.01) |
| *H04N 5/225* | (2006.01) |
| *H05B 37/02* | (2006.01) |
| *G03B 15/04* | (2006.01) |
| *H04N 5/232* | (2006.01) |
| *F21K 5/06* | (2006.01) |

(Continued)

(52) U.S. Cl.
CPC ......... *H04N 5/2256* (2013.01); *G03B 15/041* (2013.01); *G03B 15/0447* (2013.01); *G03B 15/0473* (2013.01); *G03B 15/05* (2013.01); *G03B 17/566* (2013.01); *H04N 5/23203* (2013.01); *H04N 5/23241* (2013.01); *H04N 5/23293* (2013.01); *H05B 37/0218* (2013.01); *H05B 41/36* (2013.01); *F21S 9/02* (2013.01)

(58) Field of Classification Search
CPC ........... G06K 9/2027; G06K 2209/401; G03B 2215/05; G03B 15/04; G03B 15/05; G03B 2215/0557; G03B 15/041; G03B 15/0447; G03B 15/0473; G03B 17/566; F21V 33/0052; H04N 5/2256; H04N 5/23203; H04N 5/23241; H04N 5/23293; H05B 37/0218; H05B 41/36
USPC .................................................. 396/171, 172
See application file for complete search history.

(56) References Cited

U.S. PATENT DOCUMENTS

| | | | | |
|---|---|---|---|---|
| 4,813,682 A | * | 3/1989 | Okada ..................... | A63F 13/04 |
| | | | | 345/156 |
| 5,402,201 A | * | 3/1995 | Takagi ..................... | G03B 7/16 |
| | | | | 396/172 |

(Continued)

*Primary Examiner* — Chia-Wei A Chen
(74) *Attorney, Agent, or Firm* — Muncy, Geissler, Olds & Lowe, P.C.

(57) ABSTRACT

An extension photoflash light and a camera system using the same are provided. The extension photoflash light to be externally mounted on a mobile device with a photographing function comprises a HID lamp, a mounting mechanism, a light sensing circuit and a control circuit. The mounting mechanism is for mounting the extension photoflash light. The light sensing circuit is disposed on the mounting mechanism. The control circuit is coupled to the HID lamp and the light sensing circuit. When a camera program is executed, a specific block on a flat panel display of the mobile device emits a light signal. The control circuit controls the light sensing circuit to detect the light signal of the specific block, and decodes a decoding message according to luminance of the detected light signal, and controls the HID lamp to perform flashing at a specific timing according to the decoding message.

16 Claims, 14 Drawing Sheets

(51) Int. Cl.
*G03B 15/05* (2006.01)
*F21K 5/16* (2006.01)
*G03B 17/56* (2006.01)
*H05B 41/36* (2006.01)
*F21S 9/02* (2006.01)

(56) References Cited

U.S. PATENT DOCUMENTS

| | | | | |
|---|---|---|---|---|
| 5,796,387 A * | 8/1998 | Curran | | A63F 13/04 345/157 |
| 6,171,190 B1 * | 1/2001 | Thanasack | | A63F 13/04 463/5 |
| 6,571,061 B2 * | 5/2003 | Kawasaki | | H05B 41/325 396/156 |
| 7,505,681 B2 * | 3/2009 | Shimizu | | G03B 7/16 396/157 |
| 7,697,835 B2 * | 4/2010 | Sasaki | | G03B 15/05 348/371 |
| 7,702,234 B2 * | 4/2010 | Tokiwa | | G03B 15/03 396/155 |
| 7,796,116 B2 * | 9/2010 | Salsman | | G06F 3/0346 345/158 |
| 7,829,831 B2 * | 11/2010 | Klinghult | | G03B 15/05 250/205 |
| 8,102,365 B2 * | 1/2012 | Alten | | G06F 3/0304 345/156 |
| 8,190,010 B2 * | 5/2012 | King | | G03B 17/00 396/171 |
| 8,559,810 B2 * | 10/2013 | Lin | | G03B 15/05 396/171 |
| 8,913,003 B2 * | 12/2014 | Grunnet-Jepsen | | G06F 3/0421 345/156 |
| 2003/0216151 A1 * | 11/2003 | Kitano | | H04N 1/00307 455/556.1 |
| 2007/0098392 A1 * | 5/2007 | Ziemkowski | | G03B 15/05 396/171 |
| 2007/0139550 A1 * | 6/2007 | Takematsu | | H04N 5/2354 348/371 |
| 2008/0167734 A1 * | 7/2008 | Robinson | | G05B 11/42 700/42 |
| 2009/0080174 A1 * | 3/2009 | Shimotomai | | F21S 8/006 362/1 |
| 2011/0097067 A1 * | 4/2011 | Osawa | | G03B 7/097 396/165 |
| 2012/0189290 A1 * | 7/2012 | Osawa | | G03B 7/28 396/157 |

* cited by examiner

EXTENSION PHOTOFLASH LIGHT AND CAMERA SYSTEM USING THE SAME

This application claims priority to U.S. Provisional Patent Application Ser. No. 62/317,062 filed on Apr. 1, 2016 which is incorporated herein by reference in its entirety.

BACKGROUND OF THE INVENTION

Field of the Invention

The invention relates to the technology of a photoflash light used in a mobile device, and more particularly to an extension photoflash light and a camera system using the same.

Description of the Related Art

Due to the progresses of the pixel and quality of the digital photographing, a mobile device (e.g., a mobile phone or a tablet computer) possessing the photographing function has become a trend. However, the performances of these built-in digital cameras in the low-light or backlight environment cannot match with the conventional digital camera. Although each of some mobile devices with built-in digital cameras is also equipped with a light-emitting diode (LED) assistant exposure light, the assistant exposure amount of the LED assistant exposure light is seriously restricted due to the battery capacity of the mobile device and the heat dissipating problem of the LED. When the distance to the to-be-illuminated object exceeds 1 meter, the LED cannot provide the sufficient light source to properly expose the photosensitive members.

A xenon photoflash light (high-intensity discharge (HID) lamp) can provide a lot of auxiliary light in a short period of time, so the conventional digital camera is often equipped with the xenon photoflash light. The xenon photoflash light utilizes a charger to convert the low-voltage battery power into the high-voltage power stored in a high-voltage capacitor with a high capacitance. A mechanical shutter is used to trigger the xenon photoflash light at a proper timing to convert the electric energy, stored in the high-voltage capacitor, into a high luminance auxiliary light source in a very short period of time, so that the photosensitive members are properly exposed in the low light or backlight environment. The xenon photoflash light requires the high-voltage capacitor having the capacitance ranging from several tens of μF to several hundreds of μF, and having the withstanding voltage ranging from 300 to 400 volts. These capacitors have the very large volume, and cannot be accepted by the mobile device under the slim and light preconditions of the mobile device. Thus, the extension xenon photoflash light has become a practical and essential option under the precondition without increasing the volume and weight of the mobile device.

According to the capacitance of the high-voltage capacitor and the specification of the xenon lamp, the flash time of the xenon photoflash light ranges from about several tens of microseconds to about several hundreds of microseconds. How to flash at the correct timing to uniformly expose all the photosensitive members is an important subject of determining whether the extension xenon photoflash light is feasible. The camera device installed in the typical mobile device adopts CMOS photosensitive members and a rolling shutter, as shown in FIG. 1, but no mechanical shutter. FIG. 1 is a schematic view showing a conventional rolling shutter. Referring to FIG. 1, each line represents a light sensing timing of each line of the photosensitive members. Although the rows of photosensitive members in one frame have the same exposure time span, the exposure starting and ending timings for each row are separated from those for the previous row by a period of delay time. In this delay time, the camera device reads the exposure information of the photosensitive members and resets to perform the exposure for the next frame. According to the photographing environments and different settings of the camera devices, the exposure time for each row ranges from about several milliseconds to about several hundreds of milliseconds.

However, due to the limitation of the rolling shutter, the flash time of the xenon photoflash light is only several microseconds (μs), which is relatively short, and the extension xenon photoflash light often cannot find the optimum flash timing. So, the mobile phone has to provide a signal to inform the optimum flash timing.

SUMMARY OF THE INVENTION

An object of the invention is to provide an extension photoflash light and a camera system using the same, wherein the extension photoflash light is to be hung or mounted on a mobile device, and determines the flash timing according to a light signal outputted from the mobile device to achieve the effect of synchronous flashing with the image capturing timing of the mobile device.

In view of this, the invention provides an extension photoflash light to be externally mounted on a mobile device with a photographing function. The mobile device with the photographing function has a flat panel display and a camera lens. The extension photoflash light comprises a high-intensity discharge (HID) lamp, a mounting mechanism, a light sensing circuit and a control circuit. The mounting mechanism is for mounting the extension photoflash light. The light sensing circuit is disposed on the mounting mechanism. The control circuit is coupled to the HID lamp and the light sensing circuit. The mobile device emits a light signal on a specific block of the flat panel display. The control circuit controls the light sensing circuit to detect the light signal of the specific block, decodes luminance of the detected light signal into a decoding message, and controls the HID lamp to perform flashing at a specific timing according to the decoding message.

The invention further provides a camera system comprising a mobile device and an extension photoflash light. The mobile device has a flat panel display and a camera lens. The extension photoflash light comprises a high-intensity discharge (HID) lamp, a mounting mechanism, a light sensing circuit and a control circuit. The mounting mechanism is for mounting the extension photoflash light. The light sensing circuit is disposed on the mounting mechanism. The control circuit is coupled to the HID lamp and the light sensing circuit. The mobile device emits a light signal on a specific block of the flat panel display. The control circuit controls the light sensing circuit to detect the light signal of the specific block, decodes luminance of the detected light signal into a decoding message, and controls the HID lamp to perform flashing at a specific timing according to the decoding message.

In the extension photoflash light and the camera system using the same according to the preferred embodiment of the invention, the extension photoflash light further comprises a touch simulation device disposed on a contact surface between the mounting mechanism and the flat panel display of the mobile device with the photographing function. When the mounting mechanism of the extension photoflash light touches a surface of the flat panel display of the mobile device with the photographing function, the mobile device with the photographing function configures a position of the specific block according to the touch simulation device. In another preferred embodiment, the touch simulation device further outputs a touch signal. The mobile device with the photographing function decodes the touch signal, outputted from the touch simulation device, into a receiving message according to whether a detected touch is present or not to determine a state of the extension photoflash light. In still another preferred embodiment, the state of the extension photoflash light comprises residual capacity information of a battery. In yet still another embodiment, the state of the extension photoflash light comprises information regarding whether the HID lamp is completely charged.

The essence of the invention is to provide an extension HID photoflash light that can be mounted on the mobile device, wherein a photosensitive member is disposed on the mounting mechanism of the HID photoflash light and for sensing the light signal outputted from the display device on the mobile device, and the light signal is decoded to obtain the flash time information. Thus, the photoflash light can be triggered when the mobile device is photographing, so that the photoflash light performs flashing that can fall within the flash time. Thus, the invention can properly expose the photosensitive member in the low light or backlight environment, so that the effect of enhancing the photographing quality of the mobile device can be enhanced.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

Figure 1:
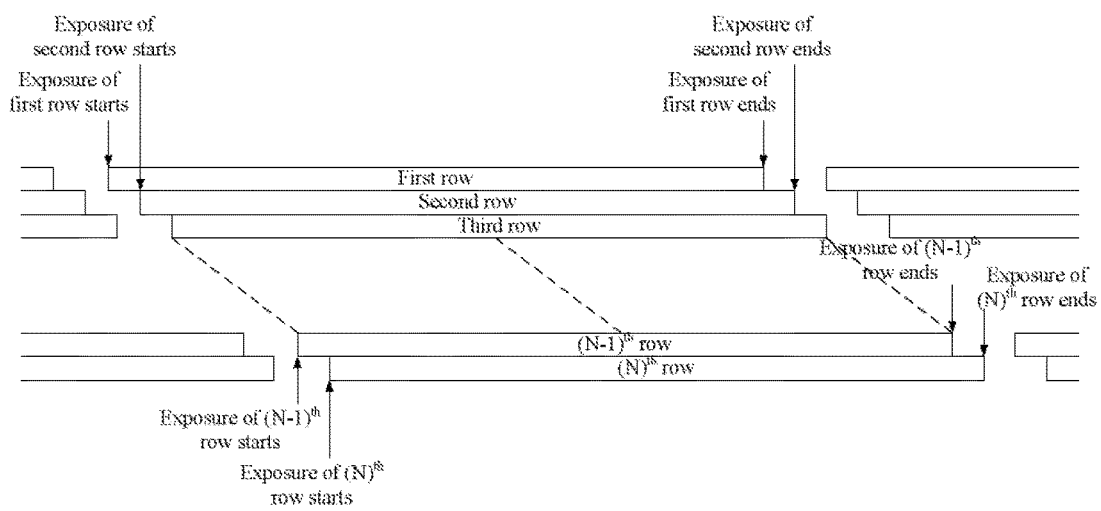
FIG. 1 is a schematic view showing a conventional rolling shutter.
Figure 2:
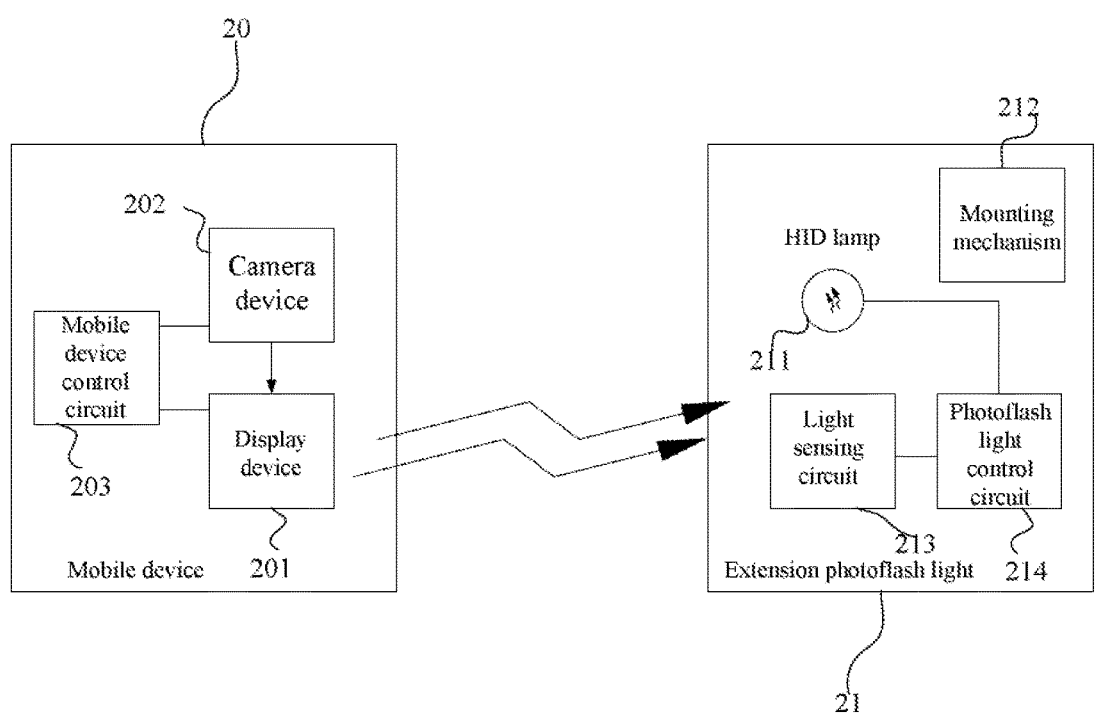
FIG. 2 is a system block diagram showing a camera system according to a preferred embodiment of the invention.

FIG. 2 is a system block diagram showing a camera system according to a preferred embodiment of the invention. Referring to FIG. 2, the camera system comprises a mobile device 20 and an extension photoflash light 21. The mobile device 20 comprises a display device 201, a camera device 202 and a mobile device control circuit 203. The extension photoflash light 21 comprises a HID lamp 211, a mounting mechanism 212, a light sensing circuit 213 and a photoflash light control circuit 214.

The mounting mechanism 212 is for mounting or hanging the extension photoflash light 21, the detailed structure of which will be described later. The light sensing circuit 213 is disposed on the mounting mechanism 212 and for sensing a light signal outputted from the display device 201 of the mobile device 20. The photoflash light control circuit 214 is coupled to the HID lamp 211 and the light sensing circuit 213.

In order to make the essence of the invention be understood more easily, it is assumed that the mobile device 20 is a smart mobile phone having a specific photographing application program (photographing APP). When the photographing APP is being executed, the mobile device control circuit 203 enables a specific block of the display device 201 to emit a light signal according to the photographing APP. In addition, it is assumed that the light sensing circuit 213 is located at a position just corresponding to the specific block, and can sense the light signal emitted from the specific block when the extension photoflash light 21 is mounted on the mobile device. When the user triggers the photographing function through the photographing APP, a non-constant delay time is present between the timing when the user triggers the photographing function through the photographing APP to the timing of true shutting because the camera device 202 of the mobile device 20 adopts the rolling shutter. The flash time of the HID lamp is only several tens of microseconds, so precise time information is needed so that the flash can be performed at the correct timing. In this embodiment, when the user triggers the photographing function through the photographing APP, the light sensing circuit 213 captures the light signal emitted from the specific block of the display device 201, and converts the light signal into an electric signal transmitted to the photoflash light control circuit 214. The photoflash light control circuit 214 decodes the electric signal into a decoding message having time information. The time information highly relates to the timing when the camera device 202 of the mobile device 20 performs the true shutting. Thus, the photoflash light control circuit 214 controls the HID lamp 211 to perform flashing at the correct timing according to the decoding message.

Figure 3:
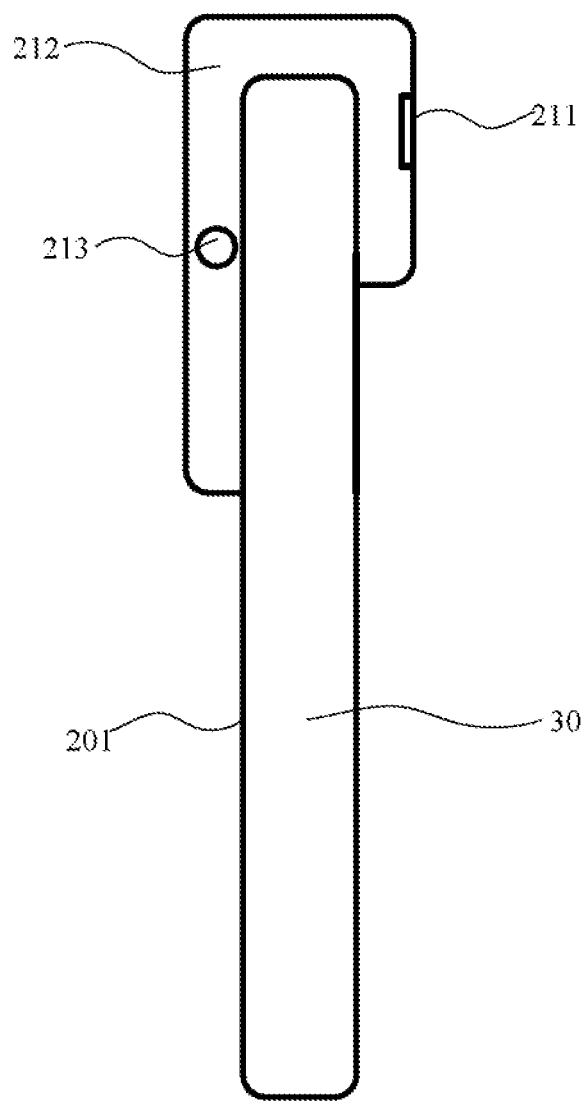
FIG. 3 is a side view showing an extension photoflash light 21 mounted on a mobile device 20 according to a preferred embodiment of the invention.
Figure 4:
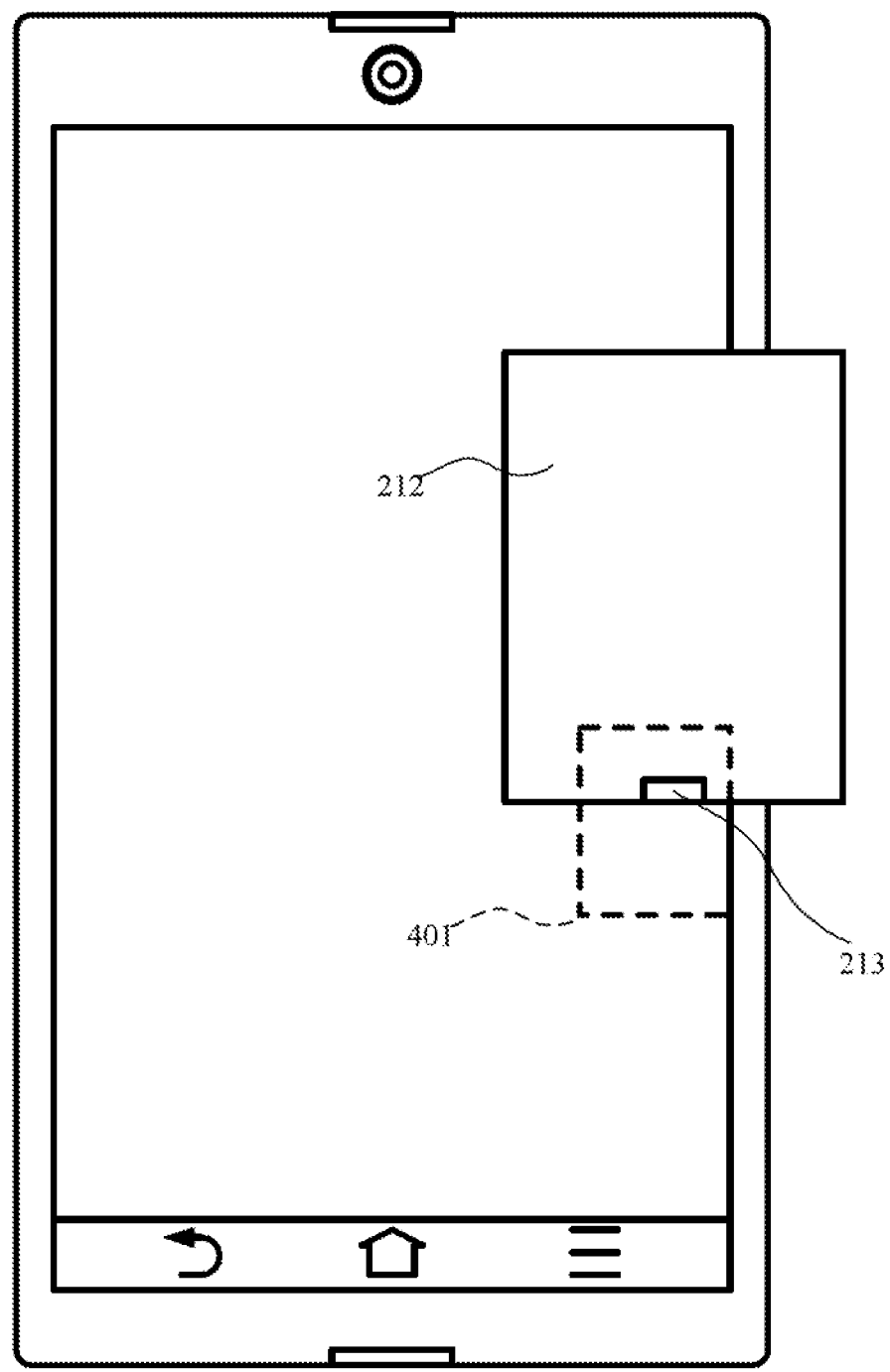
FIG. 4 is a top view showing an extension photoflash light 21 mounted on a mobile device 20 according to a preferred embodiment of the invention.

FIG. 3 is a side view showing an extension photoflash light 21 mounted on a mobile device 20 according to a preferred embodiment of the invention. Referring to FIG. 3, the extension photoflash light 21 comprises a mounting mechanism 212, a light sensing circuit 213 and a HID lamp 211. In this embodiment, the extension photoflash light 21 is hung on a lateral side of a smart mobile phone 30. FIG. 4 is a top view showing an extension photoflash light 21 mounted on a mobile device 20 according to a preferred embodiment of the invention. Referring to FIG. 4, the position of the light sensing circuit 213 of the extension photoflash light 21 corresponds to a specific block 401 of the display device 201. The mobile device control circuit 203 of the mobile device 20 controls the display device 201 to enable the specific block 401 of the display device 201 to emit a light signal, and thus to transmit the time information to the extension photoflash light 21 according to the preferred embodiment of the invention.

Figure 5:
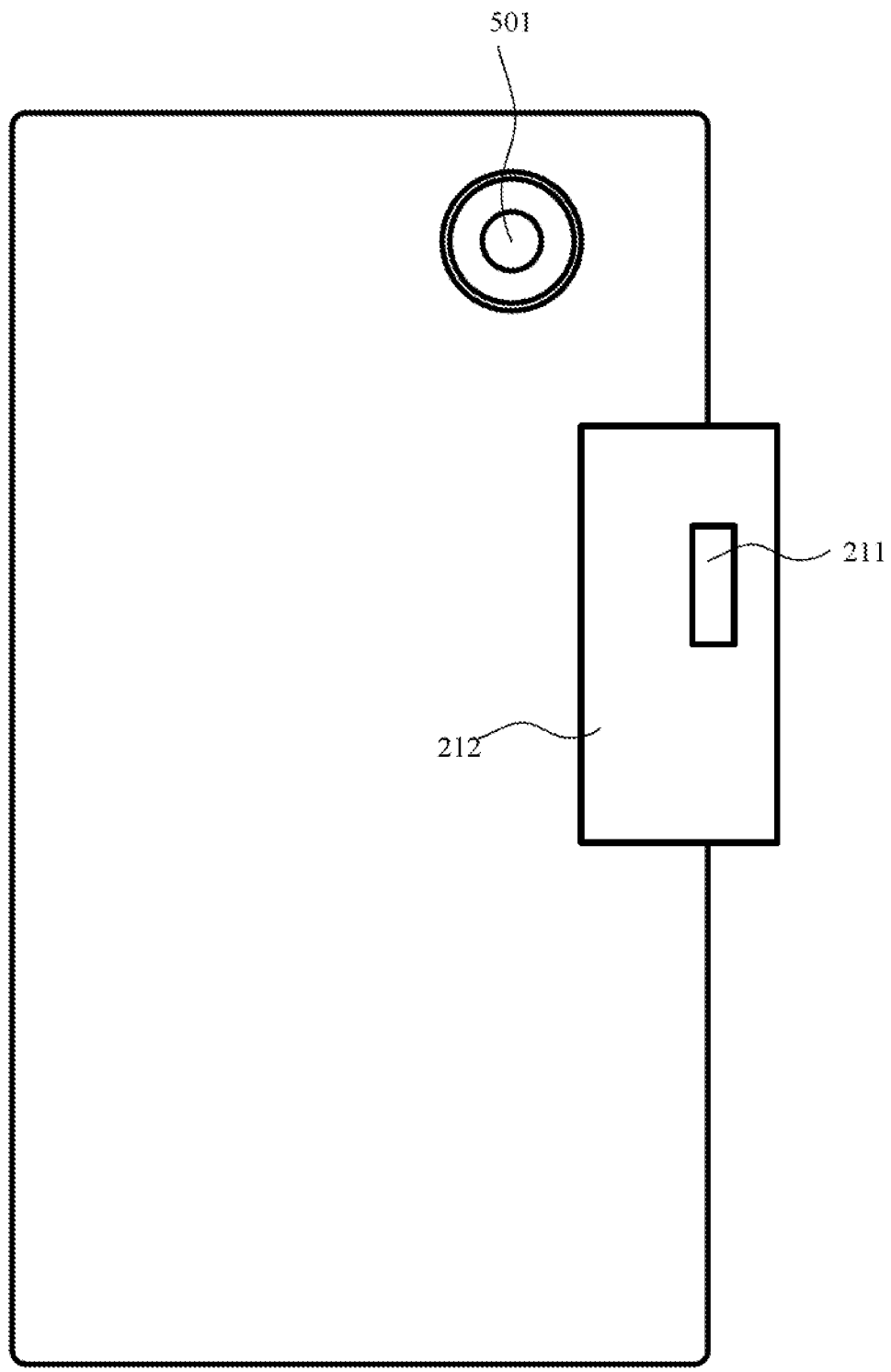
FIG. 5 is a bottom view showing an extension photoflash light 21 mounted on a mobile device 20 according to a preferred embodiment of the invention.

FIG. 5 is a bottom view showing an extension photoflash light 21 mounted on a mobile device 20 according to a preferred embodiment of the invention. Referring to FIG. 5, the HID lamp 211 of this embodiment and a rear lens 501 are disposed on the same side. So, when the rear lens 501 is used to perform photographing, the extension photoflash light 21 according to the preferred embodiment of the invention can be used to assist the exposure. In addition, even if the mobile device 20 has no built-in assistant exposure LED, the extension photoflash light 21 according to the preferred embodiment of the invention still can assist the exposure at night.

The above-mentioned embodiment is implemented using the rear lens 501 to shoot. However, the more popular selfie uses the front lens to shoot. The following embodiment provides a camera system using the front lens to shoot, and an extension photoflash light 21.

Figure 6:
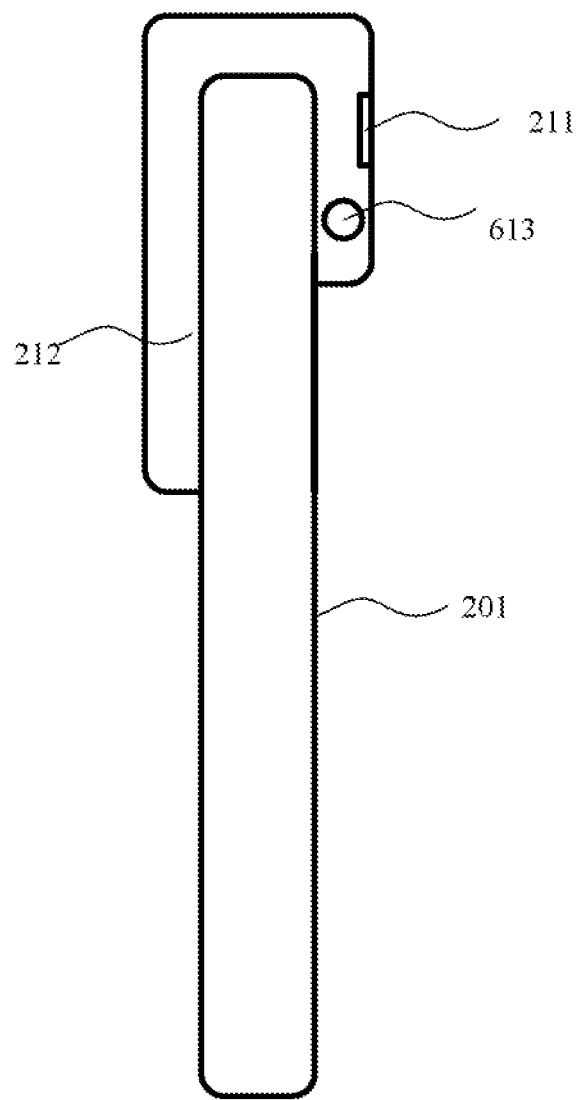
FIG. 6 is a side view showing an extension photoflash light 21 mounted on a mobile device 20 according to a preferred embodiment of the invention.

FIG. 6 is a side view showing an extension photoflash light 21 mounted on a mobile device 20 according to a preferred embodiment of the invention. Referring to FIG. 6, the extension photoflash light 21 comprises a mounting mechanism 212, a light sensing circuit 613 and a HID lamp 211. In this embodiment, the extension photoflash light 21 is similarly hung or mounted on a lateral side of the smart mobile phone 30. However, compared with FIG. 3, the light sensing circuit 613 and the HID lamp 211 are disposed on the same side of the display device 201 of the mobile device 20.

Figure 7:
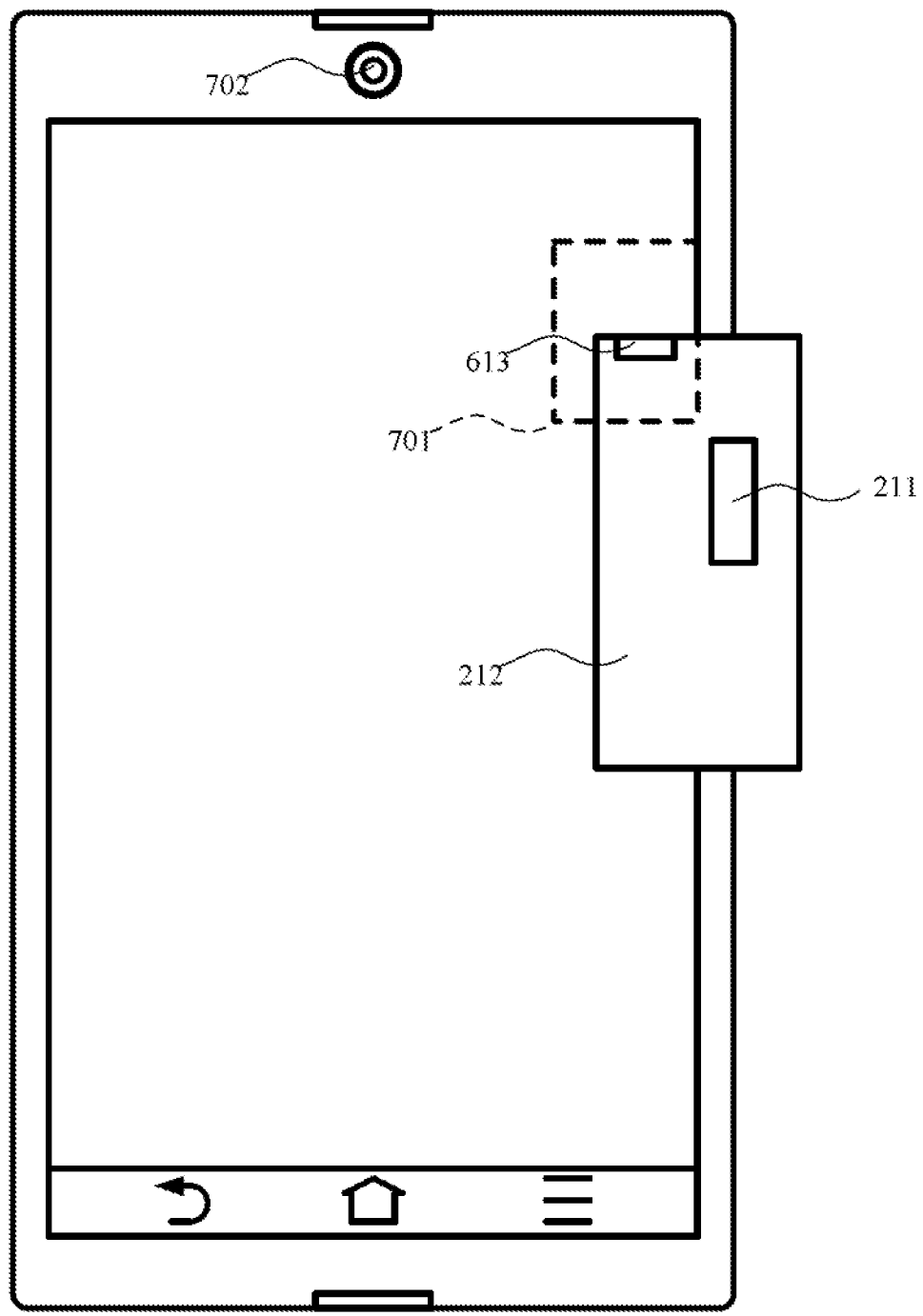
FIG. 7 is a top view showing an extension photoflash light 21 mounted on a mobile device 20 according to a preferred embodiment of the invention.

FIG. 7 is a top view showing an extension photoflash light 21 mounted on a mobile device 20 according to a preferred embodiment of the invention. Referring to FIG. 7, the position of the light sensing circuit 613 of the extension photoflash light 21 corresponds to a specific block 701 of the display device 201. The mobile device control circuit 203 of the mobile device 20 controls the display device 201 to enable the specific block 701 of the display device 201 to emit a light signal, and thus to transmit the time information, regarding the timing when a front lens 702 captures the image, to the extension photoflash light 21 according to the preferred embodiment of the invention.

Figure 8:
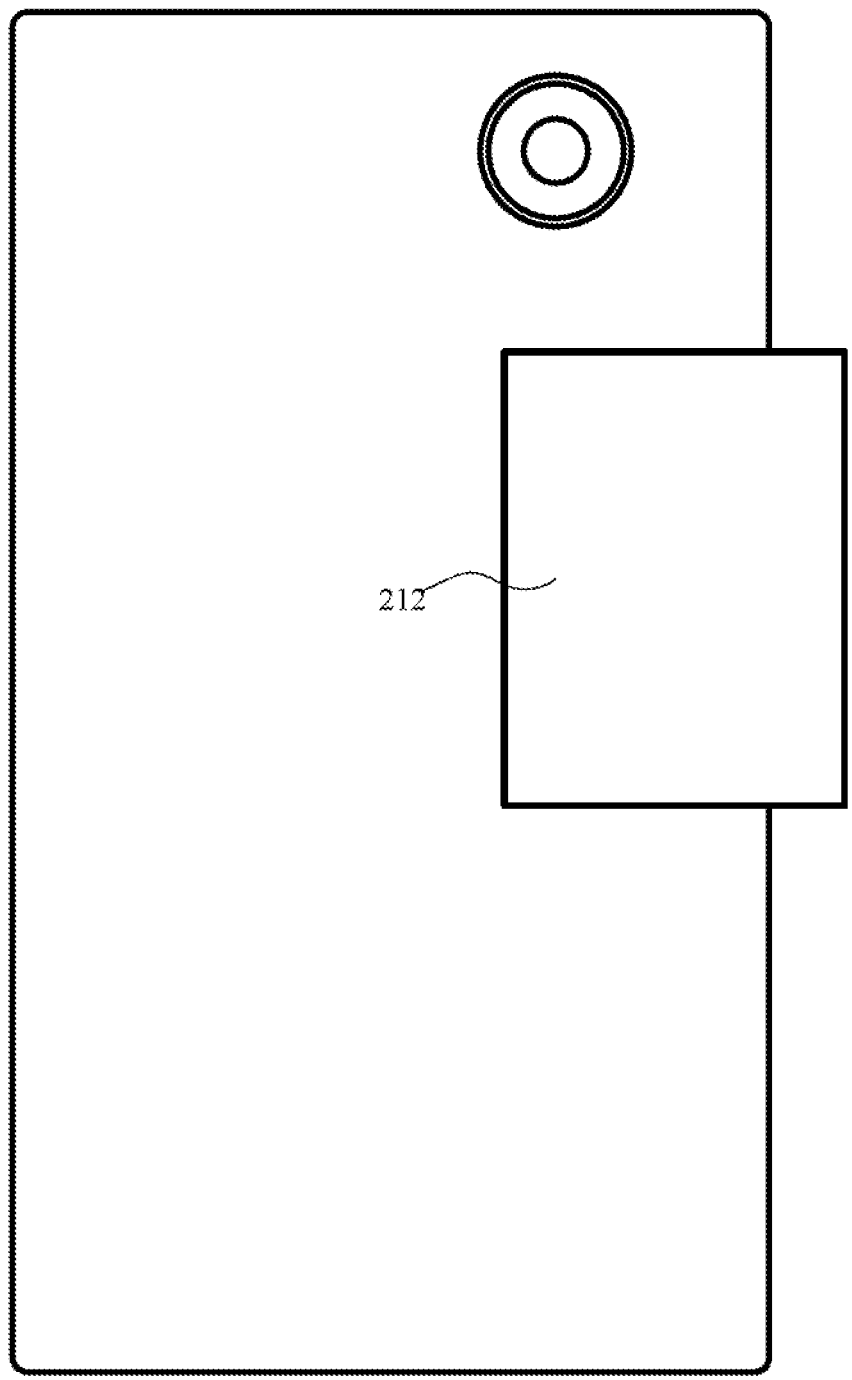
FIG. 8 is a bottom view showing an extension photoflash light 21 mounted on a mobile device 20 according to a preferred embodiment of the invention.

FIG. 8 is a bottom view showing an extension photoflash light 21 mounted on a mobile device 20 according to a preferred embodiment of the invention. Referring to FIG. 8, in this embodiment, the HID lamp 211 and the front lens 702 are disposed on the same side. So, the mounting mechanism 212 on the one side of the rear lens is only for mounting the extension photoflash light 21.

Figure 9:
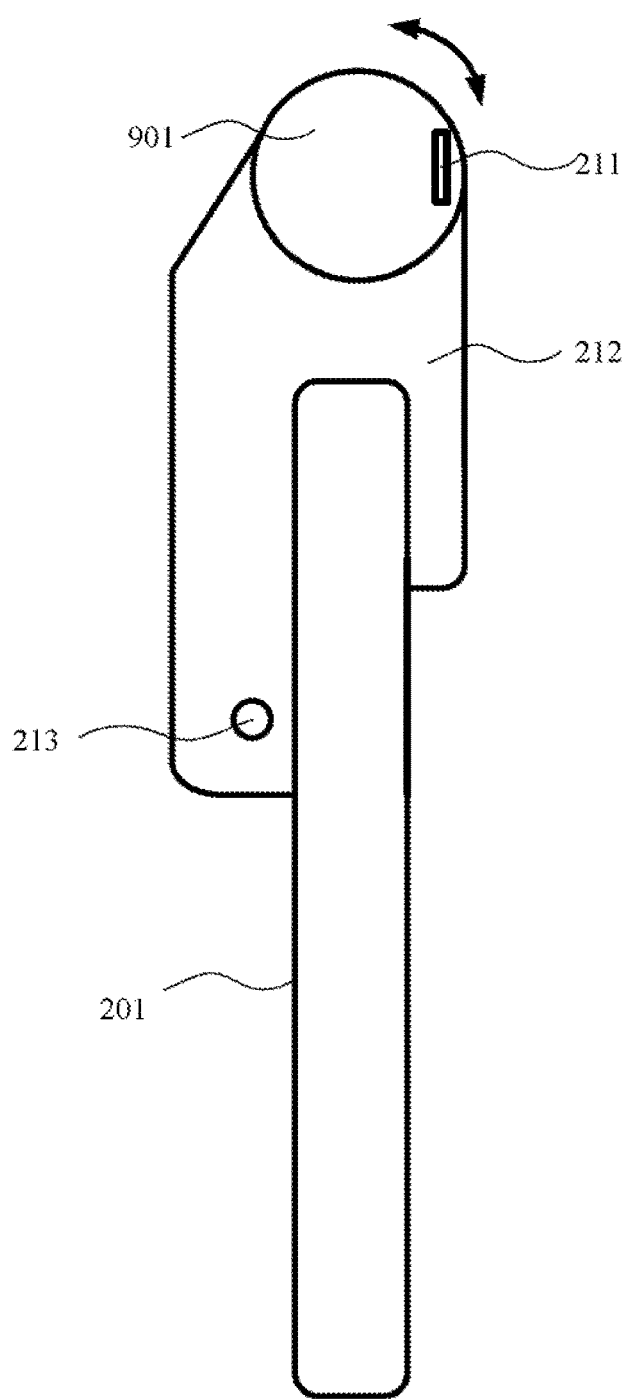
FIG. 9 is a top view showing an extension photoflash light 21 according to a preferred embodiment of the invention.

FIG. 9 is a top view showing an extension photoflash light 21 according to a preferred embodiment of the invention. Referring to FIG. 9, the extension photoflash light 21 comprises a mounting mechanism 212, a light sensing circuit 613 and a HID lamp 211. In this embodiment, the extension photoflash light 21 is similarly hung on the lateral side of the smart mobile phone 30. However, compared with FIGS. 3 and 6, the mounting mechanism 212 of the extension photoflash light 21 further comprises a rotating mechanism 901, on which the HID lamp 211 is disposed. So, the facing direction of the HID lamp 211 is changeable in this embodiment. Thus, either the selfie or the rear lens shooting is adopted, only the rotating mechanism 901 needs to be rotated to switch the facing direction of the HID lamp 211.

Figure 10:
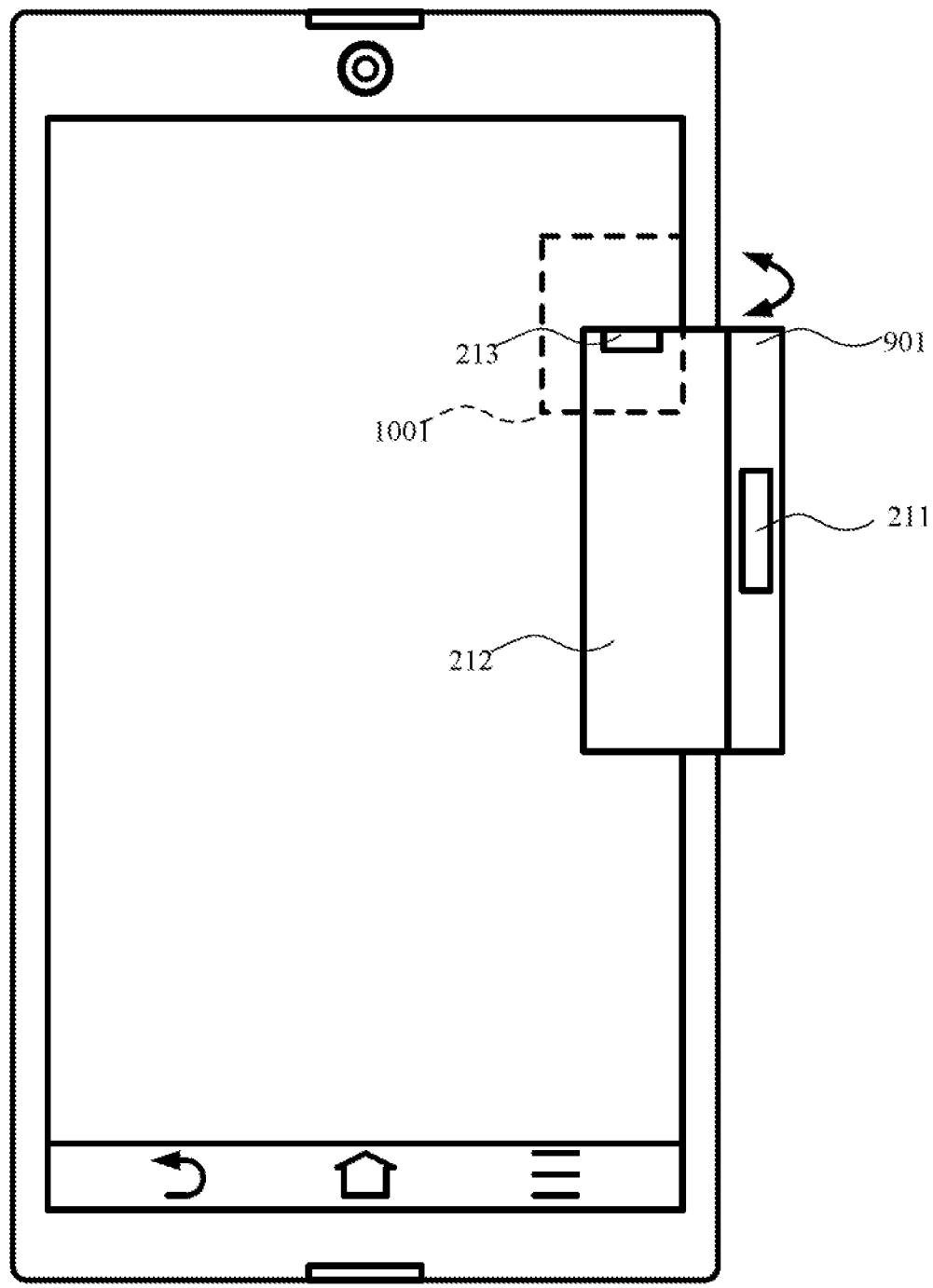
FIG. 10 is a side view showing an extension photoflash light 21 mounted on a mobile device 20 according to a preferred embodiment of the invention.
Figure 11:
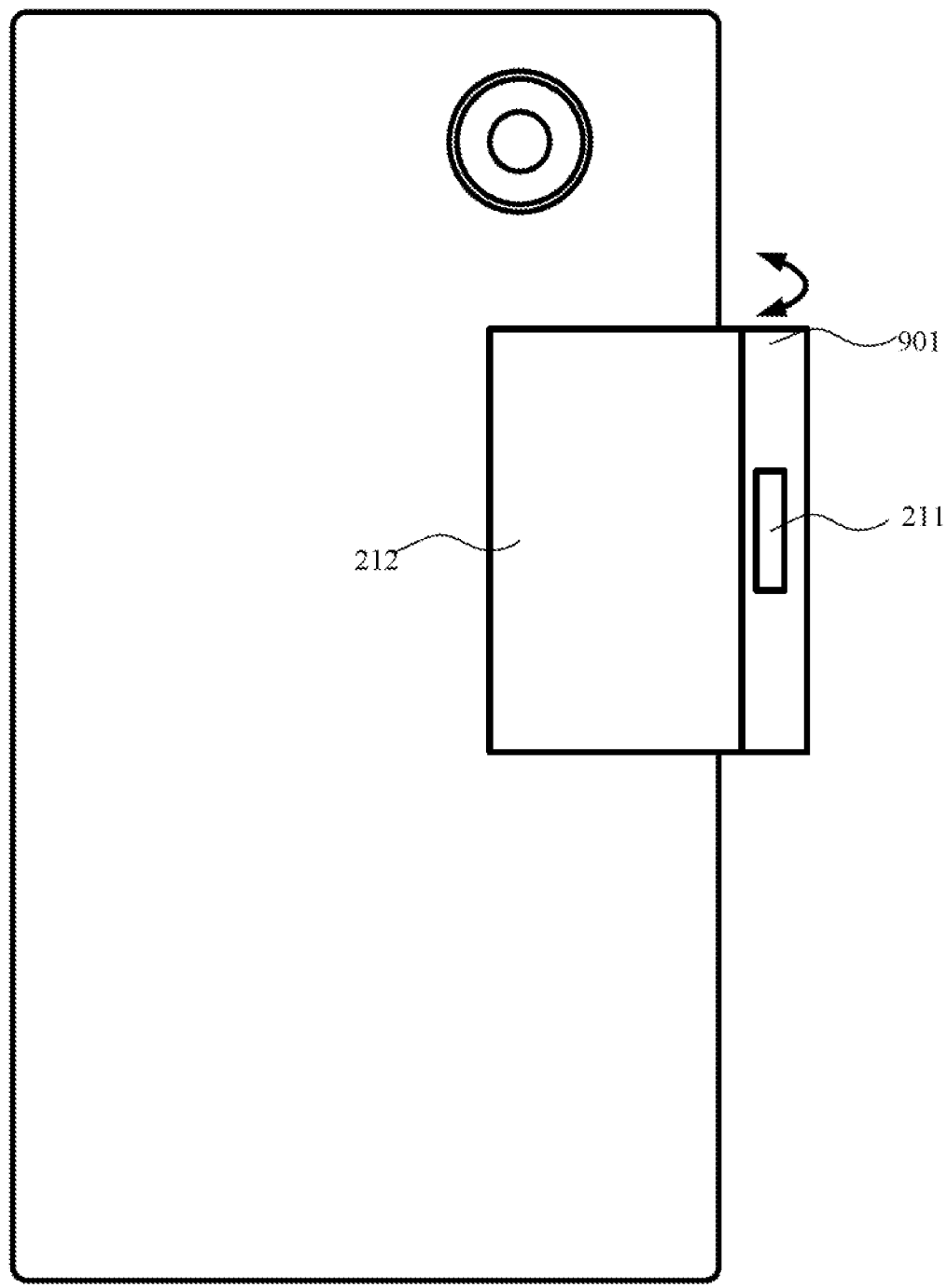
FIG. 11 is a top view showing an extension photoflash light 21 mounted on a mobile device 20 according to a preferred embodiment of the invention.

FIG. 10 is a side view showing an extension photoflash light 21 mounted on a mobile device 20 according to a preferred embodiment of the invention. Referring to FIG. 10, the position of the light sensing circuit 613 of the extension photoflash light 21 corresponds to a specific block 1001 of the display device 201. The mobile device control circuit 203 of the mobile device 20 controls the display device 201, to enable the specific block 1001 of the display device 201 to emit a light signal, and thus to transmit the time information, regarding the timing when the front lens or rear lens captures the image, to the extension photoflash light 21 according to the preferred embodiment of the invention FIG. 11 is a top view showing an extension photoflash light 21 mounted on a mobile device 20 according to a preferred embodiment of the invention. Referring to FIG. 11, the HID lamp 211 and the front lens in FIG. 10 are disposed on the same side. However, the extension photoflash light 21 of this embodiment has the rotating mechanism 901, so the user can rotate the rotating mechanism 901 to make the HID lamp 211 face the side on which the rear lens shoots.

Figure 12:
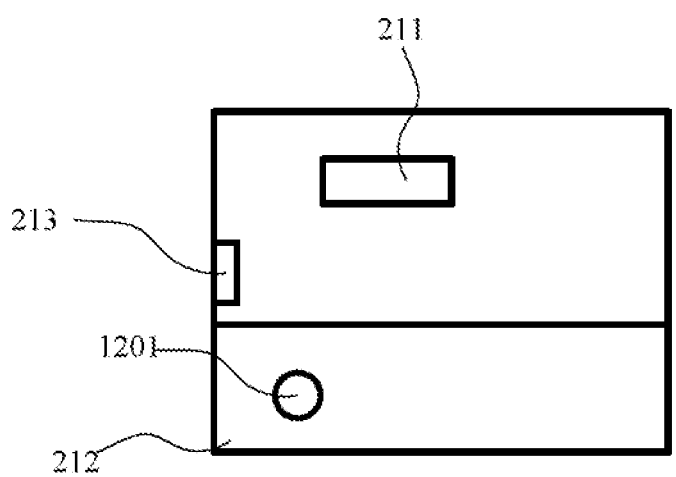
FIG. 12 is a top view showing an extension photoflash light 21 according to a preferred embodiment of the invention.

FIG. 12 is a top view showing an extension photoflash light 21 according to a preferred embodiment of the invention. Referring to FIG. 12, the extension photoflash light 21 of this embodiment further comprises a touch simulation device 1201. It is assumed that the HID lamp 211 of the extension photoflash light 21 and the rear lens are disposed to face the same side. When the extension photoflash light 21 is mounted on the mobile device 20, the touch simulation device 1201 touches the display device 201 of the mobile device 20. The touch simulation device 1201 mainly simulates a capacitive touch, for example. If the mobile device 20 is a smart mobile phone, then the mobile device 20 senses a corresponding position of the touch simulation device 1201 being touched. Thus, the mobile device 20 can judge the position where the extension photoflash light 21 is mounted, so that the position of the specific block 401 of the display device 201 is configured. If only the mounting position of the extension photoflash light 21 needs to be judged, then the touch simulation device 1201 can be implemented using a conductor similar to a front end of a touch pen.

In another condition, the touch simulation device 1201 can return the state of the extension photoflash light 21, such as the charging state of the HID lamp 211, the residual capacity information of the extension photoflash light 21 or the like, by changing the touch state. In this embodiment, the touch simulation device 1201 is coupled to the photoflash light control circuit 214. The photoflash light control circuit 214 controls the touch simulation device 1201 to make the mobile device 20 continuously detect whether or not the touch is present according to the data to be transmitted to the mobile device 20. The mobile device 20 utilizes the executed "photographing APP" to decode whether the touch is present or not to obtain the information of the state of the extension photoflash light 21, such as the charging state of the HID lamp 211, the residual capacity information of extension photoflash light 21 or the like.

Figure 13:
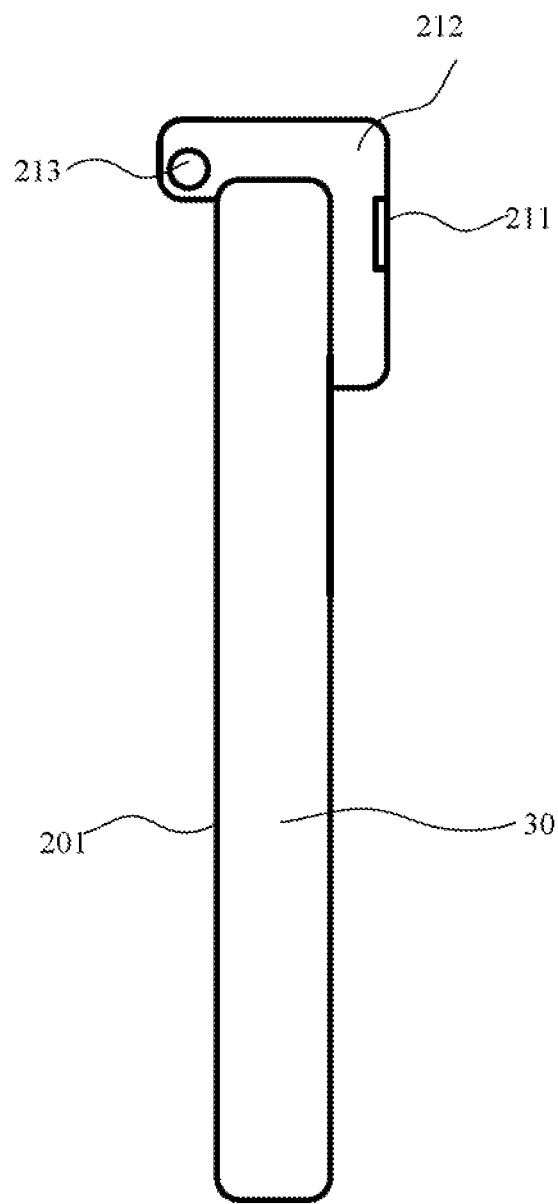
FIG. 13 is a side view showing an extension photoflash light 21 mounted on a mobile device 20 according to a preferred embodiment of the invention.
Figure 14:
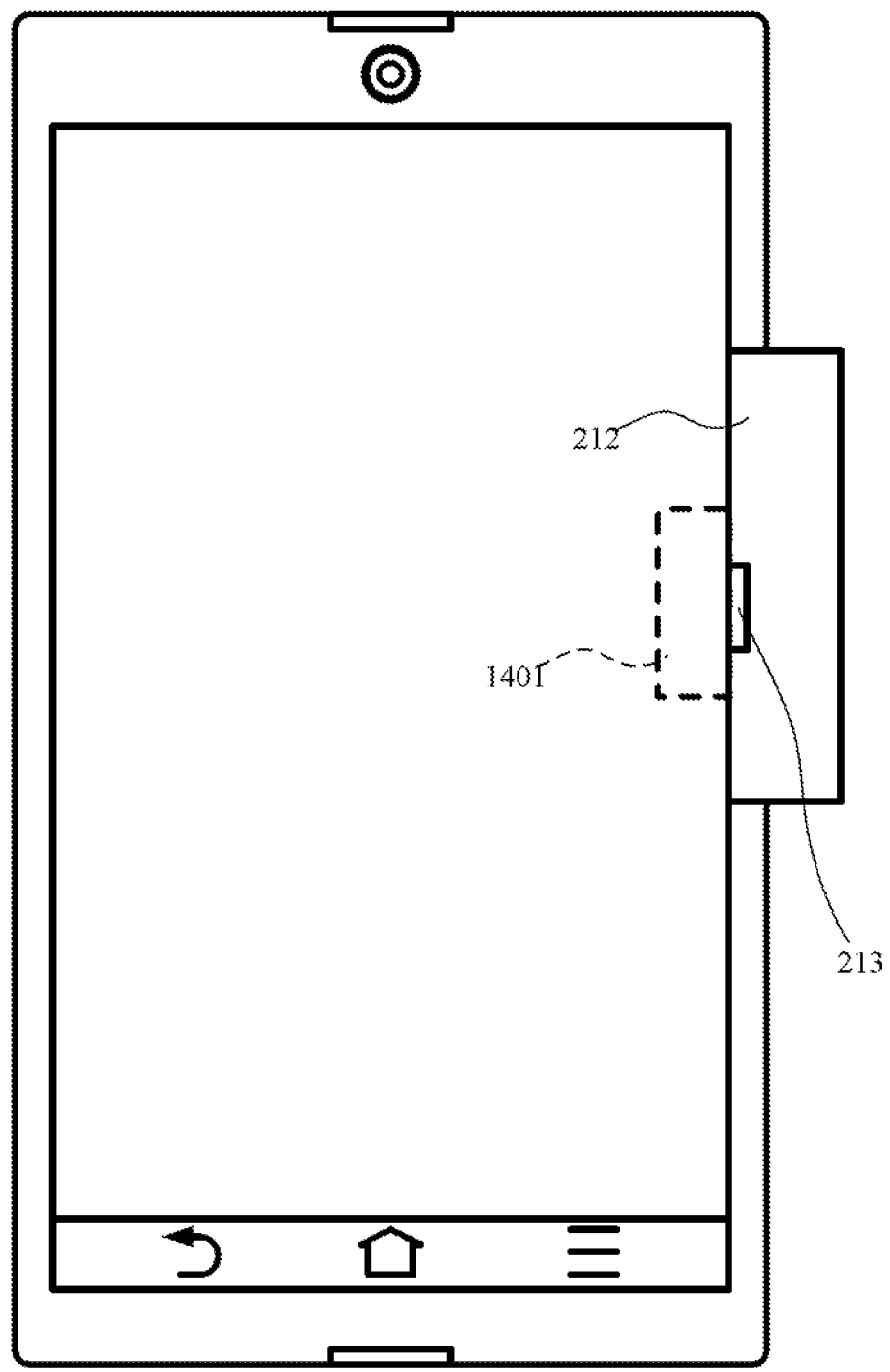
FIG. 14 is a top view showing an extension photoflash light 21 mounted on a mobile device 20 according to a preferred embodiment of the invention.

FIG. 13 is a side view showing an extension photoflash light 21 mounted on a mobile device 20 according to a preferred embodiment of the invention. Referring to FIG. 13, the mounting mechanism 212 of the extension photoflash light 21 in this embodiment is an L-shaped mounting mechanism. The light sensing circuit 213 is disposed on an edge of the L-shaped mounting mechanism. FIG. 14 is a top view showing an extension photoflash light 21 mounted on a mobile device 20 according to a preferred embodiment of the invention. Referring to FIG. 14, a specific block 1401 of the display device 201 is disposed below the light sensing circuit 213 of the extension photoflash light 21. The mobile device control circuit 203 of the mobile device 20 controls the display device 201 to enable the specific block 1401 of the display device 201 to emit a light signal, and thus to transmit the time information to the extension photoflash light 21 according to the preferred embodiment of the invention. It is obtained, from FIGS. 3 and 13, that the mounting mechanism 212 of the invention is not restricted to the configuration of FIG. 3, and any mounting mechanism, which can mount the extension photoflash light 21 on the surface of the display device 201, and can make the light sensing circuit on the mounting mechanism 212 receive the light of the display device, is deemed as falling within the scope of the invention.

In summary, the essence of the invention is to provide an extension HID photoflash light that can be mounted on the mobile device, wherein a photosensitive member is disposed on the mounting mechanism of the HID photoflash light and for sensing the light signal outputted from the display device on the mobile device, and the light signal is decoded to obtain the flash time information. Thus, the photoflash light can be triggered when the mobile device is photographing, so that the photoflash light performs flashing that can fall within the flash time. Thus, the invention can properly expose the photosensitive member in the low light or backlight environment, so that the effect of enhancing the photographing quality of the mobile device can be enhanced.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. An extension photoflash light to be externally mounted on a mobile device with a photographing function, wherein the mobile device with the photographing function has a flat panel display and a camera lens, wherein the extension photoflash light comprises:
   a high-intensity discharge (HID) lamp;
   a mounting mechanism for mounting the extension photoflash light;
   a light sensing circuit disposed on the mounting mechanism; and
   a control circuit coupled to the HID lamp and the light sensing circuit,
   wherein the mobile device emits a light signal on a specific block of the flat panel display,
   wherein the control circuit controls the light sensing circuit to detect the light signal of the specific block, decodes luminance of the detected light signal into a decoding message, and controls the HID lamp to perform flashing at a specific timing according to the decoding message.

2. The extension photoflash light according to claim 1, further comprising a touch simulation device disposed on a contact surface between the mounting mechanism and the flat panel display of the mobile device with the photographing function, wherein when the mounting mechanism of the extension photoflash light touches a surface of the flat panel display of the mobile device with the photographing function, the mobile device with the photographing function configures a position of the specific block according to the touch simulation device.

3. The extension photoflash light according to claim 2, wherein the touch simulation device is further for outputting a touch signal, wherein the mobile device with the photographing function decodes the touch signal, outputted from the touch simulation device, into a receiving message according to whether a detected touch is present or not to determine a state of the extension photoflash light.

4. The extension photoflash light according to claim 3, wherein the state of the extension photoflash light comprises residual capacity information of a battery.

5. The extension photoflash light according to claim 3, wherein the state of the extension photoflash light comprises information regarding whether the HID lamp is completely charged.

6. A camera system, comprising:
   a mobile device having a flat panel display and a camera lens; and
   an extension photoflash light, comprising:
   a high-intensity discharge (HID) lamp;
   a mounting mechanism for mounting the extension photoflash light;
   a light sensing circuit disposed on the mounting mechanism; and
   a control circuit coupled to the HID lamp and the light sensing circuit,
   wherein the mobile device emits a light signal on a specific block of the flat panel display,
   wherein the control circuit controls the light sensing circuit to detect the light signal of the specific block, decodes luminance of the detected light signal into a decoding message, and controls the HID lamp to perform flashing at a specific timing according to the decoding message.

7. The camera system according to claim 6, further comprising a touch simulation device disposed on a contact surface between the mounting mechanism and the flat panel display of the mobile device with a photographing function, wherein when the mounting mechanism of the extension photoflash light touches a surface of the flat panel display of the mobile device with the photographing function, the mobile device with the photographing function configures a position of the specific block according to the touch simulation device.

8. The camera system according to claim 7, wherein the touch simulation device is further for outputting a touch signal, wherein the mobile device with the photographing function decodes the touch signal, outputted from the touch simulation device, into a receiving message according to whether a detected touch is present or not to determine a state of the extension photoflash light.

9. The camera system according to claim 8, wherein the state of the extension photoflash light comprises residual capacity information of a battery.

10. The camera system according to claim 8, wherein the state of the extension photoflash light comprises information regarding whether the HID lamp is completely charged.

11. An extension photoflash light to be externally mounted on a mobile device with a photographing function, wherein the mobile device with the photographing function has a flat panel display and a camera lens, wherein the extension photoflash light comprises:
- a high-intensity discharge (HID) lamp;
- a mounting mechanism, which is for mounting the extension photoflash light to make the extension photoflash light be disposed between a surface of the flat panel display and a surface of the camera lens, wherein when the extension photoflash light is disposed on the mobile device with the photographing function, one surface of the mounting mechanism overlaps with one portion of the flat panel display;
- a touch simulation device disposed on the mounting mechanism, wherein when the extension photoflash light is mounted on the mobile device with the photographing function, the touch simulation device touches the surface of the flat panel display of the mobile device with the photographing function; and
- a control circuit coupled to the HID lamp,
- wherein when the mounting mechanism of the extension photoflash light touches the surface of the flat panel display of the mobile device with the photographing function, the mobile device with the photographing function obtains information of a mounting position of the extension photoflash light according to the touch simulation device.

12. The extension photoflash light according to claim 11, wherein the extension photoflash light further comprises:
- a light sensing circuit disposed on the mounting mechanism,
- wherein the control circuit is coupled to the light sensing circuit,
- wherein the mobile device emits a light signal on a specific block of the flat panel display,
- wherein the control circuit controls the light sensing circuit to detect the light signal of the specific block, decodes luminance of the detected light signal into a decoding message, and controls the HID lamp to perform flashing at a specific timing according to the decoding message.

13. The extension photoflash light according to claim 11, wherein when the mounting mechanism of the extension photoflash light touches the surface of the flat panel display of the mobile device with the photographing function, the mobile device with the photographing function configures a position of a specific block according to the touch simulation device.

14. The extension photoflash light according to claim 11, wherein the touch simulation device is further for outputting a touch signal, wherein the mobile device with the photographing function decodes the touch signal, outputted from the touch simulation device, into a receiving message according to whether a detected touch is present or not to determine a state of the extension photoflash light.

15. The camera system according to claim 14, wherein the state of the extension photoflash light comprises residual capacity information of a battery.

16. The camera system according to claim 14, wherein the state of the extension photoflash light comprises information regarding whether the HID lamp is completely charged.

* * * * *